United States Patent [19]

Neveux

[11] 4,094,358
[45] June 13, 1978

[54] LIQUID COOLING APPARATUS

[75] Inventor: René Neveux, Les Clayes-sous-Bois, France

[73] Assignee: Societe Anonyme Francaise du Ferodo, Paris, France

[21] Appl. No.: 672,546

[22] Filed: Mar. 29, 1976

[30] Foreign Application Priority Data

Apr. 2, 1975 France .............................. 75 10251

[51] Int. Cl.² ........................................... F28D 7/12
[52] U.S. Cl. .................................. 165/154; 165/141; 184/104 B; 285/161
[58] Field of Search .................. 165/141, 154, 155; 29/157.3 C, 157.4; 285/161, 212, 220, 132; 184/104 B

[56] References Cited

U.S. PATENT DOCUMENTS

| 548,706 | 10/1895 | Gundermann | 285/212 |
|---|---|---|---|
| 1,024,436 | 4/1912 | Cartault | 165/154 |
| 1,030,306 | 6/1912 | Hull | 285/161 |
| 1,278,018 | 9/1918 | Roberts | 165/154 |
| 2,277,885 | 3/1942 | Rodanet | 285/212 |
| 2,410,912 | 11/1946 | Wenk | 165/154 X |
| 2,611,585 | 9/1952 | Boling | 165/154 X |
| 2,706,620 | 4/1955 | Graves | 165/141 |
| 2,752,128 | 6/1956 | Dedo | 165/155 |
| 2,889,733 | 6/1959 | Vanderhoof | 285/220 |
| 3,196,198 | 7/1965 | Rex | 165/154 |
| 3,841,667 | 10/1974 | Sands | 285/220 |

FOREIGN PATENT DOCUMENTS 229,939 5/1925 United Kingdom ................ 165/141

Primary Examiner—Charles J. Myhre
Assistant Examiner—Sheldon Richter
Attorney, Agent, or Firm—Wigman & Cohen

[57] ABSTRACT

Apparatus for cooling liquids, especially lubricating oil for internal combustion engines or heat engines, etc., including a heat exchanger formed by at least one tube for circulating said liquid to be cooled, immersed in a cooling liquid. The exchanger is connected to the outside circuit by connectors passing through the wall of the container of the cooling liquid. These connectors are formed in two parts, one of which projects externally, said parts being so shaped that when assembled they jointly form an annular cavity which surrounds the edge of the opening formed in the container wall; the volume of said cavity diminishes gradually when said two parts are joined together whereby to confine and tighten a flexible seal placed within said cavity.

7 Claims, 6 Drawing Figures

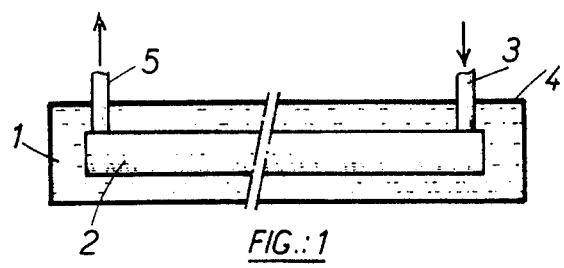
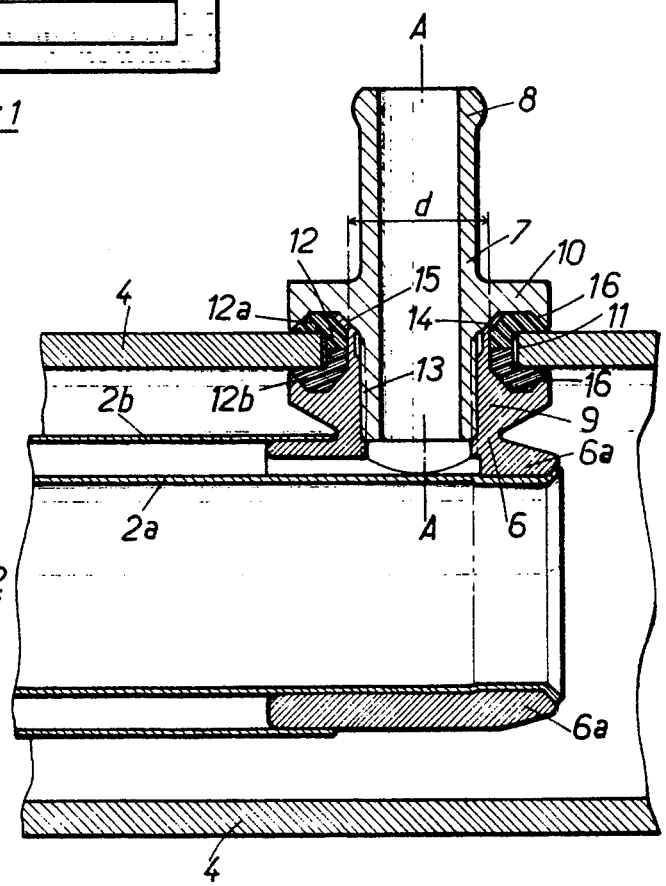
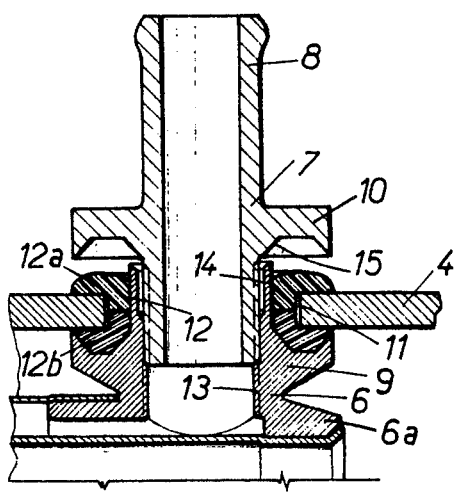

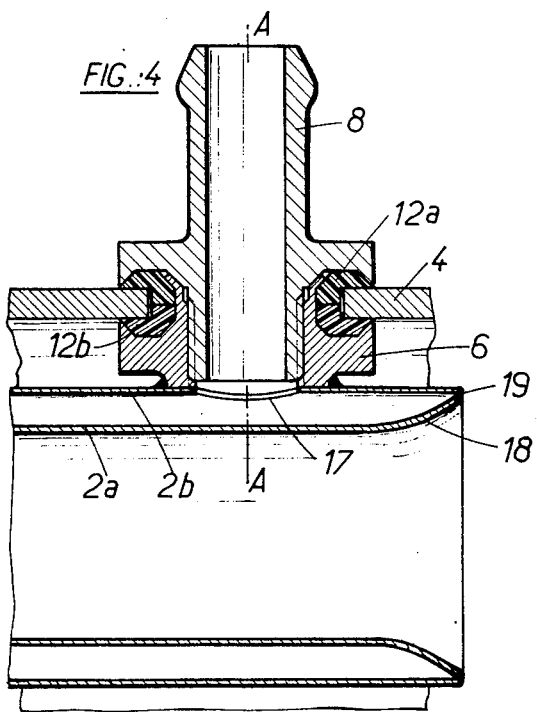
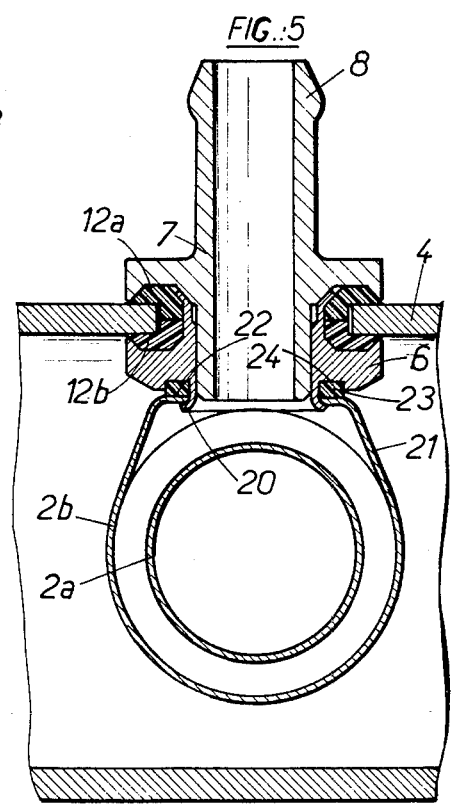
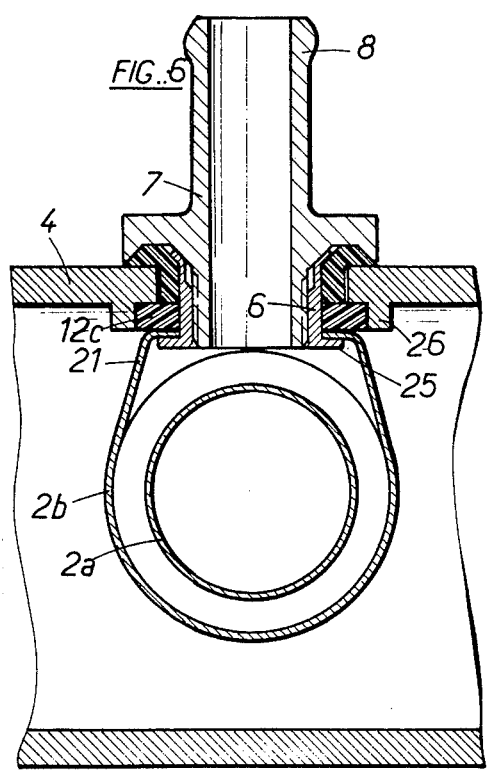

LIQUID COOLING APPARATUS

This invention relates to apparatus for cooling liquids, especially lubricating oil for internal combustion engines or heat engines, or the fluid used in torque convertors.

As is known, such apparatus includes a heat exchanger formed by at least one tube or plate for circulating the liquid to be cooled, immersed in a cooling liquid such as water contained in a container. The exchanger is connected to the circuit carrying the liquid to be cooled by connectors passing through the wall of the water container.

It is an object of this invention to provide leak-tightness at the place where the connectors pass through the wall of the water container, without the need for any welds, thereby making it possible to use a water container the wall of which is made of plastic material throughout.

It is another object of the invention to provide fixing means for the connectors on the wall of the water container such that they be capable of absorbing differences in expansion between the wall of the water container and those parts of the exchanger which may be raised to relatively high temperatures.

Still another object of the invention is to retain, between the various parts of the exchanger and the water container, sufficient interconnection means to support the exchanger when the inflow and outflow connectors for the fluid to be cooled are removed.

In accordance with the invention, the connectors are formed in two parts, one of which projects externally, said parts being so shaped that when assembled they jointly form an annular cavity which surrounds the edge of the opening formed in the container wall and the volume of which diminishes gradually when said two parts are joined together whereby to tighten and confine a flexible seal placed within said cavity, astride the edge of said opening. That part of the connector which penetrates into the container containing the cooling liquid terminates, at its end serving for introduction of the other part, in a thinned down rim, and the other external part has a frusto-conical surface facing said rim, whereby when the two parts are joined together the rim is flared and splayed over the flexible seal, thereby helping to tighten the same, at the same time as, through its permanent deformation, it additionally restrains that part of the connector which is inside the container when the external portion is removed.

The description which follows with reference to the accompanying non-limitative exemplary drawings will give a clear understanding of how the invention can be carried into practice.

In the forms of embodiment illustrated hereinafter, the invention is assumed to be applied to the cooling of the lubricating oil of a heat engine.

In the drawings:

FIG. 1 schematically depicts, on a reduced scale, a horizontal section taken through a radiator water container with an oil tube mounted therein;

FIG. 2 shows on an enlarged scale a section through one of the connectors having its two parts joined together;

FIG. 3 correspondingly shows the two parts separated, as they appear prior to initial joining;

FIG. 4 shows an alternative embodiment of the interconnecting means between the oil tube and the internal part of the connector; and FIGS. 5 and 6 are sectional views of two further alternative embodiments, taken through a plane perpendicular to the oil tube axis.

FIG. 1 shows in horizontal section a radiator water container 1 and an oil tube 2 immersed in the water thereof. This tube receives the oil to be cooled through a connector 3 which extends through the wall 4 of container 1 and delivers the cooled oil to the exterior through a further connector 5 likewise extending through wall 4.

The tubes 2 are preferably annular and, as shown in FIG. 2, are formed by two coaxial cylindrical walls 2a, 2b between which flows the oil. Inner wall 2a is open at both ends whereby the internal surface of wall 2a and the external surface of wall 2b are immersed in the cooling water contained in container 1. The latter may be one of the compartments of the cooling radiator of a heat engine.

In the embodiment shown in FIG. 2, the connectors 3 and 5 each include a portion 6 made fast with the oil tube in the interior of the water container and a portion 7 lying essentially outside the container and having a nozzle 8 for providing the link with the oil circuit. In this embodiment, internal portion 6 includes a cylindrical base 6a to which the walls 2a and 2b, which are made of metal, are leak tightly united, for instance by welding.

Connector portions 6 and 7, which have a form of revolution about the connector axis A—A, each have a flange 9 (or 10) of diameter large enough to extend well beyond the rim of the circular opening 11 formed in water container wall 4 for passage of the connector therethrough.

The connector diameter $d$ level with wall 4 is furthermore distinctly smaller than the diameter of the opening 11 in wall 4, whereby there is formed between the connector and wall 4 an annular cavity 12 inside which may be accommodated a likewise annular flexible seal, having a roughly semicircular cross-section, that lies astride and clamps the rim of the opening when the two connector parts (shown separated in FIG. 3) are joined together upon initial assembly. In this case assembly is effected by screwing the external part 7 into the internal part 6 by means of a screw thread 13.

The seal, which is fairly thick, may be formed of two rings 12a and 12b which are superimposed in order to facilitate installation.

It is to be noted also from FIG. 3 that the inner part 6 is formed at its end into which the outer part engages with an initially cylindrically shaped thinned-down lip 14. The outer part 7 is formed, facing lip 14, with a frusto-conical portion 15. When the two parts are joined together, frusto-conical surface 15 imparts a permanent deformation to lip 14, which tightens down and compresses the seal 12a, as shown in FIG. 2.

It is accordingly possible, once initial assembly has been effected, to withdraw outer part 7 by unscrewing it, without the part 6 being released from the seal. Thus there is no danger of causing oil tube 2 to drop into the water container when it is required to remove the inflow and outflow connectors for the fluid to be cooled.

It may also be noted that the edges of flanges 9 and 10 of the two connector parts are formed with a projection 16 turned towards wall 4 and extending very close up to the same when the two connector parts are joined together. This enables the seal to be powerfully compressed and imprisoned when the two connector parts are joined together, without the seal being able to creep to the exterior responsively to the pressure, even at the relatively high temperatures to which it is subjected.

The space between the connector and opening 11 level with wall 4 is large enough for it to be possible to house in the annular cavity a flexible seal of thickness such that its deformations be capable of absorbing differences in expansion between the water container wall (the temperature of which is the same as the water temperature) and tubes 2a, 2b (which are subjected to the oil temperature).

It has been found that a suitable material for forming seal 12a, 12b is tetrafluoroethylene, which stands up well to the temperatures which lubricating oil may reach. Varieties of synthetic rubber such polyacrylic rubber may also be suitable.

The alternative embodiment in FIG. 4 differs from the previously described embodiment in that the base 6a of connector part 6 is dispensed with, part 6 terminating at its base in a cylindrical surface which hugs the wall of tube 2b which is welded thereto around the hole 17 formed therein.

Tubes 2a and 2b are joined together through the agency of a flared portion 18 on one of them and a weld 19.

The embodiment in FIG. 5 is similar except that the part 6 is joined by a crimping 20 to tube 2b which, at the location of the union, is formed with a dished portion 21 having a flat surface 22 upon which rests the connector part 6 restrained by the crimping 20. An annular seal 23 is provided between base 22 and part 6 and is clamped by the crimping action. This seal is accommodated in an annular cavity 24 in part 6.

The form of embodiment shown in FIG. 6 derives from that in FIG. 5, except that part 6 terminates in a flat flange 25 upon which rests the edge of the hole formed in the dished portion 21 of tube 2b. Connector parts 6 and 7 cooperate mutually as described with reference to FIGS. 2 and 3, but the lower part of the seal is formed by a flat ring 12c clamped between water container wall 4 and the edge of dished portion 21, the latter itself bearing on flange 25 when connector parts 6 and 7 are joined together.

Wall 4 is formed with an annular projection 26 which may be moulded on, into which locates the seal 12c, which is accordingly confined therein.

It goes without saying that changes and substitutions of parts may be made in the specific embodiments hereinbefore described without departing from the scope of the invention.

I claim:

1. Apparatus for cooling liquid, such as oil, including an exchanger disposed within a container having a wall and being filled with a cooling medium, such as water, said wall having passages therethrough, fluid connectors fixed to said exchanger for the inflow and outflow of the liquid to be cooled and extending through the passages in said container wall, each connector comprising two parts, each part extending through said container wall from opposite sides thereof, one part penetrating the other part, said two parts, when assembled together, forming an annular cavity closed on at least one side of said container wall and enclosing the rim of the passage associated therewith and an annular seal arranged in said cavity astride the rim of said passage and substantially filling said cavity, the volume of said cavity gradually diminishing and compressing said seal during assembly of said two parts.

2. Apparatus according to claim 1, wherein said annular seal is made of tetrafluoroethylene.

3. Apparatus for cooling liquid, such as oil, including an exchanger disposed within a container having a wall and being filled with a cooling medium, such as water, said wall having passages therethrough, fluid connectors fixed to said exchanger for the inflow and outflow of the liquid to be cooled, each connector comprising a first part and a second part adapted to be assembled together, said first connector part having an end extending through an associated passage in said wall, said connector end having a thinned-down lip, said second connector part extending through said associated passage including a section having a frusto-conical surface confronting said lip, said frusto-conical surface bearing against said lip and imparting a deformation thereto when said connector parts are assembled together.

4. Apparatus according to claim 3, wherein at least one of the connector parts includes a flange with a cross-section larger than its associated passage in the container wall.

5. Apparatus for cooling liquid, such as oil, including an exchanger disposed within a container having a wall and being filled with a cooling medium, such as water, said wall having passages therethrough, fluid connectors fixed to said exchanger for the inflow and outflow of the liquid to be cooled and extending through the passages in said container wall, each connector comprising two parts, said two parts, when assembled together, forming an annular cavity closed on at least one side of said container wall and enclosing the rim of the passage associated therewith and an annular seal arranged in said cavity astride the rim of said passage and substantially filling said cavity, said seal comprising at least two rings, at least one of said rings having a semicircular cross-section.

6. Apparatus according to claim 5, wherein at least one of said two parts includes a flange having a cross-section larger than the passage in the container wall, said flange having a peripheral projection extending toward the container wall, said projection being closely spaced from said container wall when said two parts are assembled together.

7. Apparatus for cooling liquid including a heat exchanger disposed within a container having a wall formed of a synthetic plastic material and adapted to be filled with a cooling medium, said wall having passages therethrough, fluid connectors formed of a metallic material and fixed to said exchanger for the inflow and outflow of the liquid to be cooled and extending through the passages in said container wall, each connector comprising two parts adapted to be assembled together and extending through said container wall from opposite sides thereof, said two parts, when assembled together, forming an annular cavity closed on at least one side of said container wall and enclosing the rim of the passage associated therewith and an annular seal arranged in said cavity astride the rim of said passage and substantially filling said cavity, one of said connector parts including an end having a thinned-down lip, the other connector part including a section having a frusto-conical surface confronting said lip, said frusto-conical surface bearing against said lip and deforming said lip outwardly toward said annular cavity when said connector parts are assembled together to thereby compress the seal in said cavity and form a sealed connection between said connector and container wall.

* * * * *